United States Patent
Osawa et al.

(10) Patent No.: US 6,979,710 B2
(45) Date of Patent: Dec. 27, 2005

(54) CURABLE FLUOROPOLYETHER RUBBER COMPOSITIONS AND RUBBER ARTICLES

(75) Inventors: Yasuhisa Osawa, Gunma-ken (JP); Hirofumi Kishita, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/714,664

(22) Filed: Nov. 18, 2003

(65) Prior Publication Data

US 2004/0096667 A1    May 20, 2004

(30) Foreign Application Priority Data

Nov. 19, 2002 (JP) .............................. 2002-335129

(51) Int. Cl.$^7$ .............................................. C08L 83/05
(52) U.S. Cl. .................... 524/588; 528/31; 528/25; 525/479; 556/445
(58) Field of Search .................... 528/31, 25; 524/588; 525/479; 556/445

(56) References Cited

U.S. PATENT DOCUMENTS 5,665,846 A    9/1997  Sato et al.
5,837,774 A * 11/1998  Tarumi et al. .............. 525/100
6,160,074 A * 12/2000  Matsuda et al. .............. 528/42

FOREIGN PATENT DOCUMENTS

| EP | 0 725 113 B1 | 9/2000 |
| JP | 8-199070 A | 8/1996 |
| JP | 2990646 B2 | 10/1999 |

OTHER PUBLICATIONS

Patent Abstracts of Japan, vol. 2003, No. 12, corresponding to JP 2003 292761 A, Oct. 15, 2003.

* cited by examiner

Primary Examiner—Kuo-Liang Peng
(74) Attorney, Agent, or Firm—Birch, Stewart, Kolasch & Birch, LLP

(57) ABSTRACT

A curable fluoropolyether rubber composition comprising (A) a straight-chain fluoropolyether compound having at least two alkenyl groups and a perfluoropolyether structure, (B) an organosilicon compound having at least two SiH groups, (C) a perfluoroparaffin or derivative in powder form, at least 80% by weight of which volatilizes off when held in a drier at 200° C. for 4 hours, and which has a melting point of at least 50° C., and (D) a hydrosilylation catalyst cures into a product that exhibits solvent resistance, chemical resistance, weather resistance, water repellency, oil repellency and heat resistance, and is improved in mold release and compression set.

5 Claims, No Drawings

CURABLE FLUOROPOLYETHER RUBBER COMPOSITIONS AND RUBBER ARTICLES

This Nonprovisional application claims priority under 35 U.S.C. § 119(a) on Patent Application No(s). 2002-335129 filed in JAPAN on Nov. 19, 2002, the entire contents of which are hereby incorporated by reference.

This invention relates to curable fluoropolyether rubber compositions which cure into rubbers having good solvent resistance, chemical resistance, weather resistance, parting property, water repellency, oil repellency and heat resistance as well as improved mold release and compression set, and rubber articles obtained therefrom.

BACKGROUND ART

Japanese Patent No. 2,990,646 (JP-A 8-199070) discloses a composition comprising a straight-chain fluoropolyether compound having at least two alkenyl groups in a molecule and a perfluoropolyether structure in the backbone, an organosilicon compound having at least two H—SiOSiO structures in a molecule, and a hydrosilylation catalyst, which cures into parts having a good profile of heat resistance, chemical resistance, solvent resistance, water repellency, oil repellency, weather resistance and the like.

This fluoropolyether rubber composition can be readily formed into most shapes. In the case of complex shape parts or thin-wall parts like diaphragms, however, it is difficult to remove the molded composition from the mold because of tackiness. Since the difficulty of mold release leads to low production yields of molding step and an increased duration of molding cycle, there is a need for further improvement in processability.

If customarily used mold release agents of the internal addition type for rubber materials based on silicone oil and surfactant (known as internal mold release agents) are incorporated, they invite a rise of viscosity and a loss of fluidity, leading to molding difficulties. It was then proposed to improve mold release by adding a compound containing at least one fluorine atom and at least one hydroxyl group in a molecule and having a melting point of at least 50° C. in powder form as typified by bisphenol AF. This additive is effective for improving mold release, but is left in the molding composition. For molded parts, the additive becomes an essentially unnecessary impurity which can have a negative impaction the physical properties, chemical resistance and heat resistance of the molded parts.

SUMMARY OF THE INVENTION

An object of the invention is to provide curable fluoropolyether rubber compositions which contains an internal mold release agent that will volatilize off by heat treatment and which cures into products exhibiting good heat resistance, chemical resistance, solvent resistance, water repellency, oil repellency and weather resistance, and improved parting properties, especially mold release properties. Another object is to provide rubber articles made therefrom.

It has been found that by incorporating a perfluoroparaffin or perfluoroparaffin derivative in powder form which contains at least 80% by weight of a volatile component that volatilizes off when held in a drier at 200° C. for 4 hours, and has a melting point of at least 50° C. in a fluoropolyether rubber composition, the composition is improved in mold release without an increase of viscosity. This composition does not contain the internal mold release agent which will become an impurity after heat treatment of molded parts.

In one aspect, the present invention provides a curable fluoropolyether rubber composition comprising (A) a straight-chain fluoropolyether compound having at least two alkenyl groups in a molecule and a perfluoropolyether structure in the backbone, (B) an organosilicon compound having at least two silicon atom-bonded hydrogen atoms in a molecule, (C) a perfluoroparaffin or perfluoroparaffin derivative in powder form which contains at least 80% by weight of a volatile component that volatilizes off when held in a drier at 200° C. for 4 hours, and has a melting point of at least 50° C., and (D) a hydrosilylation catalyst.

In another aspect, the present invention provides a rubber article comprising the curable fluoropolyether rubber composition in the cured state.

DESCRIPTION OF THE PREFERRED EMBODIMENT

Component (A) of the curable fluoropolyether rubber composition according to the invention is a straight-chain fluoropolyether compound having at least two alkenyl groups in a molecule and a perfluoropolyether structure in the backbone.

The preferred alkenyl groups in the straight-chain fluoropolyether compound are alkenyl groups of 2 to 8 carbon atoms having a $CH_2$=CH— structure at an end such as vinyl, allyl, propenyl, isopropenyl, butenyl and hexenyl groups, with the vinyl and allyl being preferred. The alkenyl groups may be attached to the backbone of the straight-chain fluoropolyether compound at opposite ends either directly or through divalent linkages such as —$CH_2$—, —$CH_2$O— or —Y—$NR^1$—CO—. Herein Y is —$CH_2$— or a dimethylphenylsilylene group of the formula:

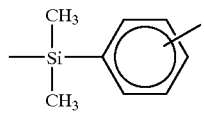

(inclusive of o-, m- and p-positions) and $R^1$ is hydrogen, methyl, phenyl or allyl. In component (A), at least two alkenyl groups must be contained per molecule.

The straight-chain fluoropolyether compound (A) has a perfluoropolyether structure in its backbone, which is described later.

One illustrative example of component (A) is a branched polyfluorodialkenyl compound having the following general formula (2).

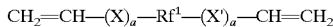(2)

Herein X is —CH$_2$—, —CH$_2$O—, —CH$_2$OCH$_2$— or —Y—NR$^1$—CO— wherein Y is —CH$_2$— or an o, m or p-dimethylsilylphenylene group of the following structural formula (Z):

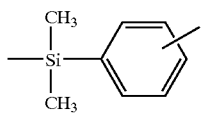(Z)

and R$^1$ is hydrogen or a substituted or unsubstituted monovalent hydrocarbon group, X' is —CH$_2$—, —OCH$_2$—, —CH$_2$OCH$_2$— or —CO—NR$^1$—Y'— wherein Y' is —CH$_2$— or an o, m or p-dimethylsilylphenylene group of the following structural formula (Z'):

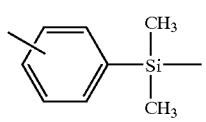(Z')

and R$^1$ is as defined above,
Rf$^1$ is a divalent perfluoropolyether group, and
"a" is independently 0 or 1.

In formula (2), Rf$^1$ is a divalent perfluoropolyether structure, preferably having the following general formula (i) or (ii).

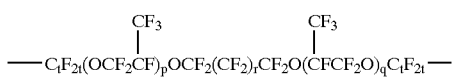(i)

Herein, p and q each are an integer of 1 to 150, the sum of p+q is 2 to 200 on average, r is an integer of 0 to 6, and t is 2 or 3.

(ii)

Herein, u is an integer of 1 to 200, v is an integer of 1 to 50, and t is as defined above.

Another illustrative example of component (A) is a branched polyfluoromonoalkenyl compound having the following general formula (3).

(3)

Herein X' and "a" are as defined above, Rf$^2$ is a group of the general formula (iii):

(iii)

wherein t is as defined above, and w is an integer of at least 1, which is smaller than any of the sum of p+q (average) and r and the sum of u and v for Rf$^1$ in formula (2).

Preferred examples of component (A) are compounds having the following general formula (1).

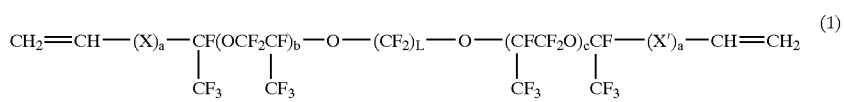(1)

Herein X is —CH$_2$—, —CH$_2$O—, —CH$_2$OCH$_2$— or —Y—NR$^1$—CO— wherein Y is —CH$_2$— or an o-, m- or p-dimethylsilylphenylene group of the following structural formula (Z):

(Z)

and R$^1$ is hydrogen, methyl, phenyl or allyl,
X' is —CH$_2$—, —OCH$_2$—, —CH$_2$OCH$_2$— or —CO—NR$^1$—Y'— wherein Y' is —CH$_2$— or an o-, m- or p-dimethylsilylphenylene group of the following structural formula (Z'):

(Z')

and R$^1$ is as defined above,
"a" is independently 0 or 1, L is an integer of 2 to 6, and b and c each are an integer of 0 to 200.

Specific examples of suitable straight-chain fluoropolyether compounds having formula (1) are given below.

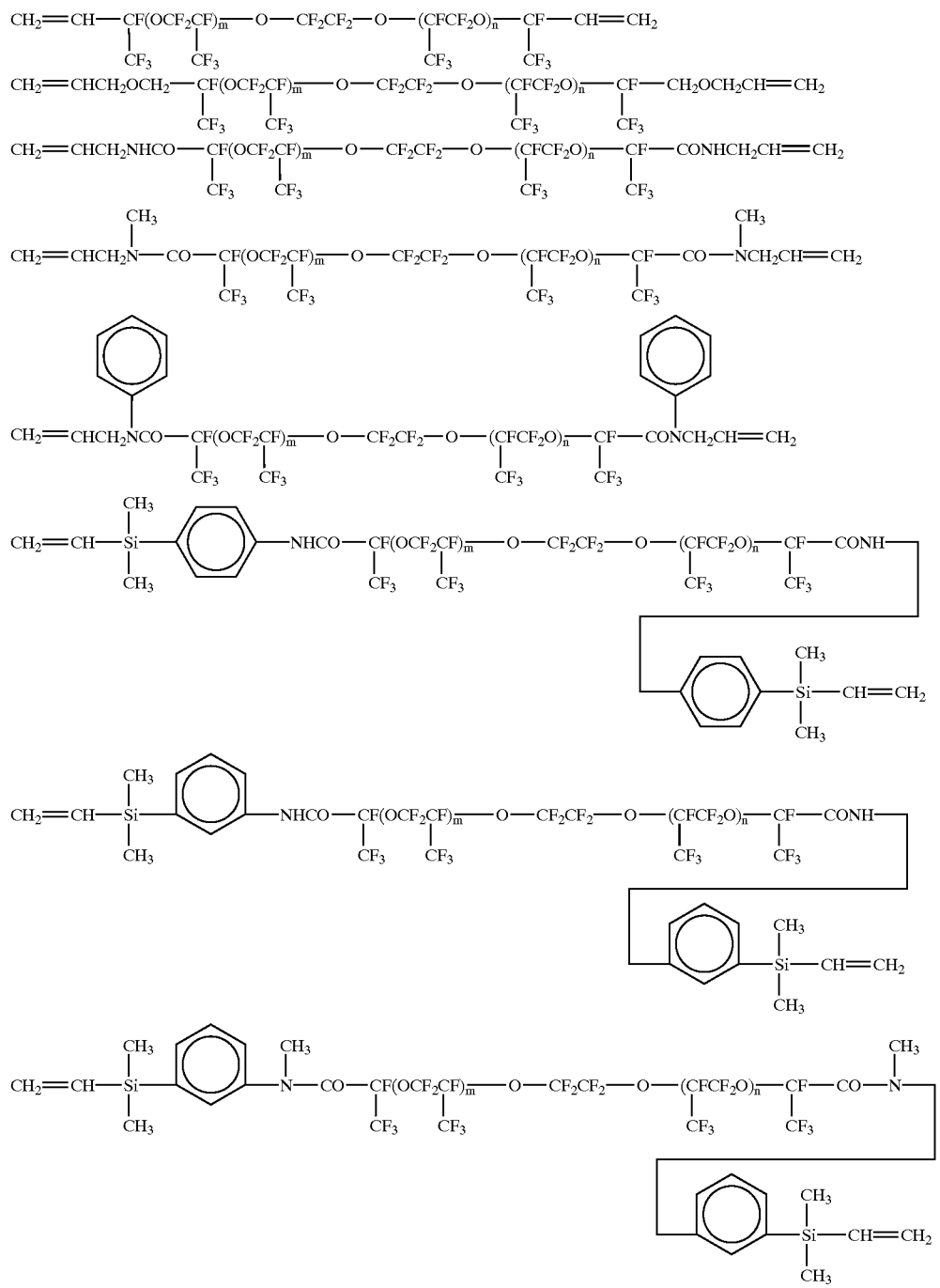

In the formulae, m and n each are an integer of 0 to 200, and the sum of m+n is 6 to 200.

These straight-chain fluoropolyether compounds may be used alone or in admixture of any.

Component (B) is an organosilicon compound having at least two silicon atom-bonded hydrogen atoms (i.e., SiH groups) in a molecule. The organosilicon compound (B) serves as a crosslinking agent and chain extender for component (A). When compatibility with and dispersion in component (A) and uniformity after curing are taken into account, the organosilicon compound should preferably have at least one fluorinated group in a molecule.

Suitable fluorinated groups include those of the following general formulae.

Letter g is an integer of 1 to 20, preferably 2 to 10.

Letter g is an integer of 1 to 20, preferably 2 to 10.

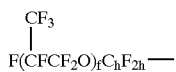

Letter f is an integer of 2 to 200, preferably 2 to 100, and h is an integer of 1 to 3.

Letters i and j each are an integer of at least 1, and an average of i+j is from 2 to 200, preferably from 2 to 100.

—(CF$_2$O)$_r$—(CF$_2$CF$_2$O)$_s$—CF$_2$—

Each of r and s is an integer of 1 to 50.

These perfluoroalkyl, perfluorooxyalkyl, perfluoroalkylene and perfluorooxyalkylene groups may be attached to silicon atoms either directly or through divalent linking groups. Such divalent linking groups are alkylene and arylene groups and combinations thereof, which may have an intervening bond such as an ether bond-forming oxygen atom, amide bond, carbonyl bond or the like. Illustratively, divalent linking groups having 2 to 12 carbon atoms are preferred, examples of which are given below.

—CH$_2$CH$_2$—

—CH$_2$CH$_2$CH$_2$—

—CH$_2$CH$_2$CH$_2$OCH$_2$—

—CH$_2$CH$_2$CH$_2$—NH—CO—

—CH$_2$CH$_2$CH$_2$—N(Ph)—CO—

—CH$_2$CH$_2$CH$_2$—N(CH$_3$)—CO—

—CH$_2$CH$_2$CH$_2$—O—CO—

Note that Ph is phenyl.

Examples of the organosilicon compounds having such fluorinated groups are shown below. Note that Me is methyl and Ph is phenyl.

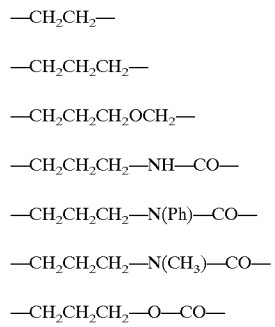

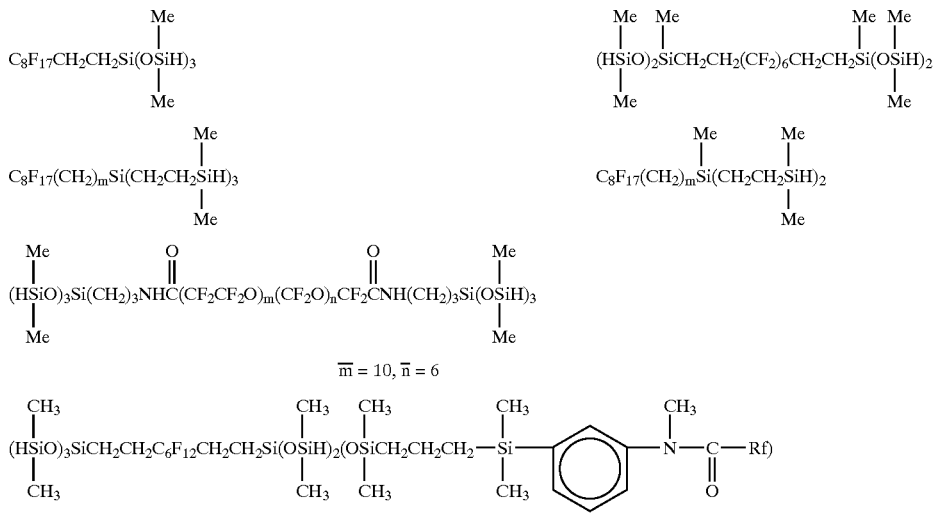

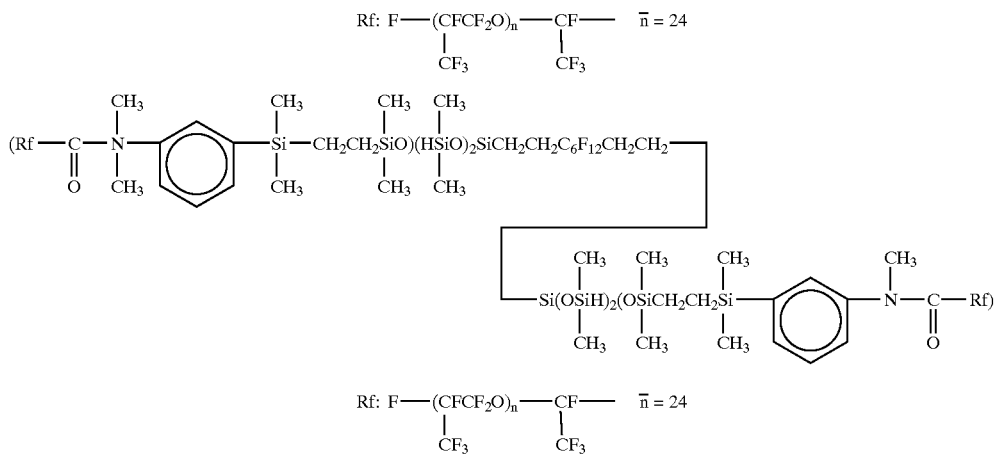

-continued
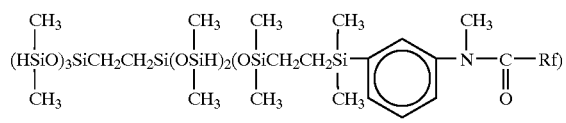
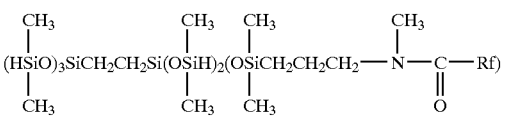
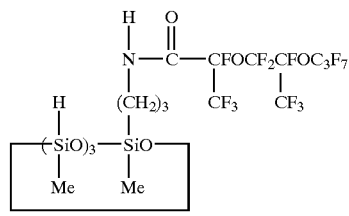
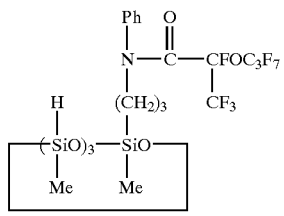
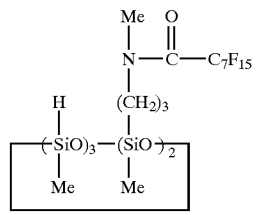
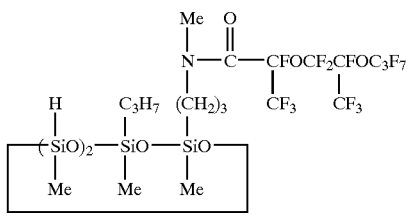
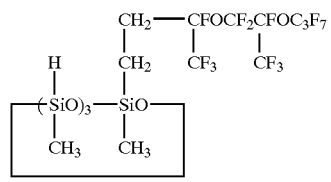
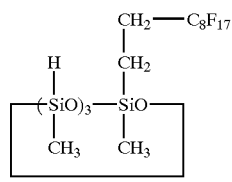
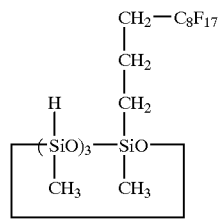
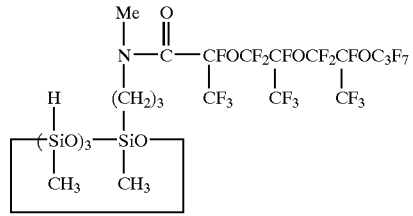
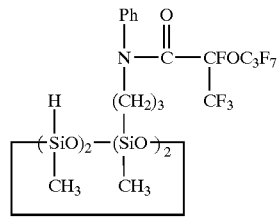
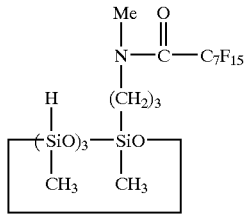
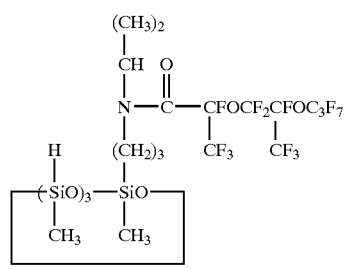

-continued
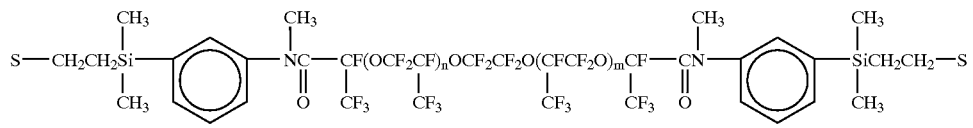
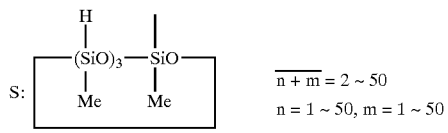
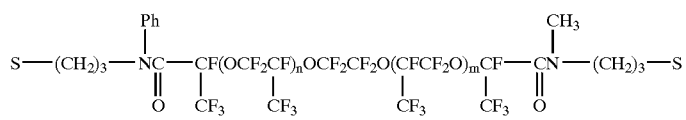
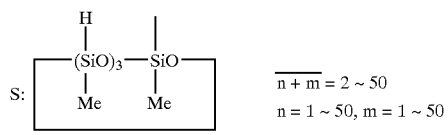
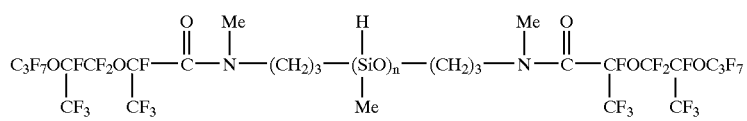
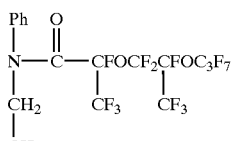
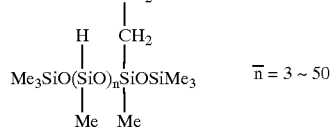
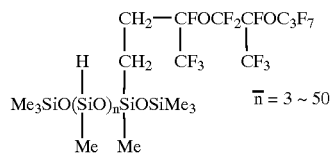
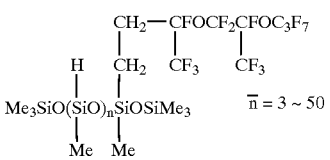
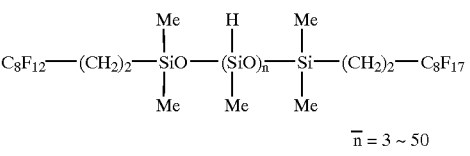
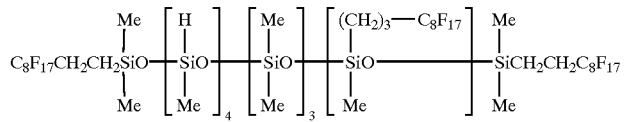
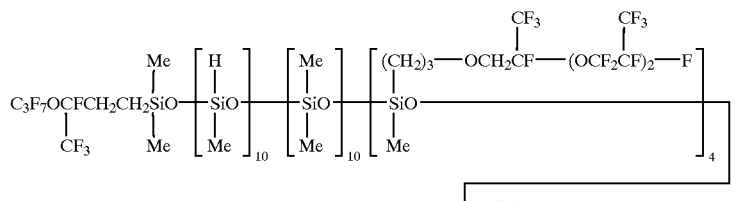
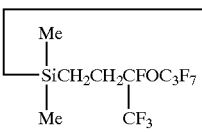

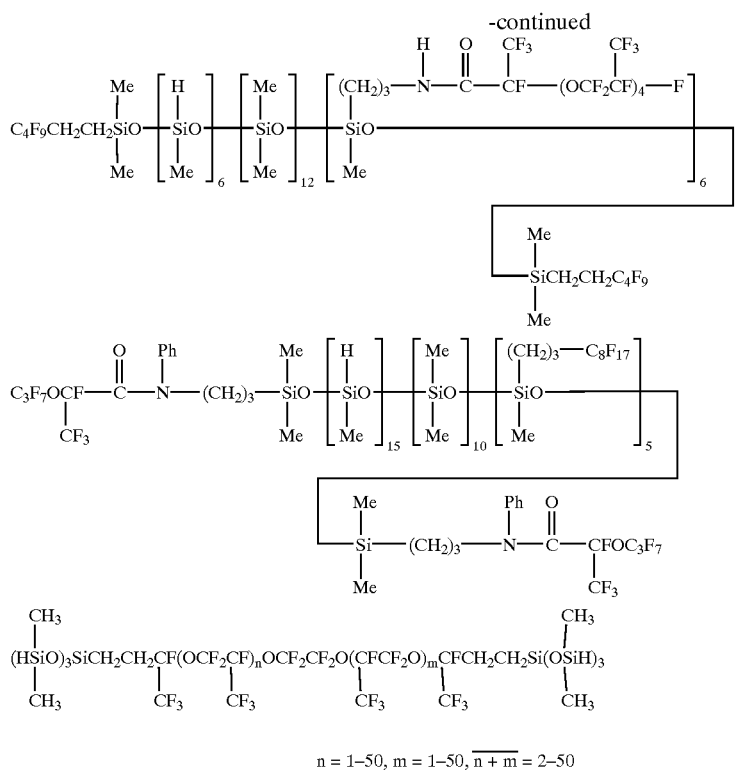

n = 1–50, m = 1–50, n + m = 2–50

These organosilicon compounds may be used alone or in admixture of two or more.

Component (B) is blended in an effective amount to cure component (A). Most often, component (B) having hydrosilyl (or SiH) groups is blended in such an amount as to provide 0.5 to 5 mol, and more preferably 1 to 2 mol of SiH groups per mol of alkenyl groups (e.g., vinyl, allyl or cycloalkenyl) in component (A). Less amounts of component (B) may achieve an insufficient degree of crosslinking. Excessive amounts of component (B) may allow chain lengthening to become preferential, inviting under-curing, foaming, and degradation of heat resistance and compression set.

Component (C) is a perfluoroparaffin or perfluoroparaffin derivative in powder form which contains at least 80% by weight of a volatile component that volatilizes off when held in a drier at 200° C. for 4 hours, and has a melting point of at least 50° C. Component (C) which is very important in the present invention functions to impart release properties in the step of shaping in a mold. Since component (C) can be removed by heat treatment after molding, it no longer becomes an impurity in molded parts. In this sense, component (C) is an internal mold release agent that imparts release properties in the molding step without the risk of detracting from the properties of molded parts.

If a customary liquid internal mold release agent is added to a polymer component, the resulting composition becomes thickened due to the lack of compatibility therebetween, and thus difficult to work. This approach is impractical. Sometimes, the liquid internal mold release agent will separate from the composition during storage. In this sense, it is crucial that the internal mold release agent (C) be solid or powder during storage at room temperature. Storage stability requires the additive to have a melting point of at least 50° C.

For dispersion in component (A), the molecular structure of the additive should be perfluoroparaffin or perfluoroparaffin derivative. A non-perfluoroparaffin additive is difficult to disperse in the composition uniformly and cannot be volatilized off upon heating because the additive does not migrate through the rubber composition even when melted.

Component (C) should meet the requirement that when about 1 gram of the material in a dish is held in a drier at 200° C. for 4 hours, 80% by weight or more of the material volatilizes off. This is necessary in order that upon heating, the additive migrate through the composition and volatilize off from the surface of molded part. If the additive is not volatile, it blooms on the surface of a molded rubber part to degrade the outer appearance. Since component (C) is uniformly dispersed in the inventive composition, it is kept bloomed on the surface of a molded rubber part to prevent the part from sticking to any object unless heat treatment is carried out.

If heat treatment is not carried out or if heat treatment is carried out under such conditions that part of component (C) is left behind, the bloomed layer on the surface serves as a release layer, preventing molded parts from sticking to each other or to any adjacent object during use under pressure contact conditions. That is, the molded part can be readily separated from the adjacent molded part or other object.

The perfluoroparaffin or perfluoroparaffin derivative in powder form which contains at least 80% by weight of a volatile component that volatilizes off when held in a drier at 200° C. for 4 hours, and has a melting point of at least 50° C. is preferably selected from those having the general formulae (7) and (8).

$$CF_3(CF_2)_xCF_3 \quad (7)$$

$$CF_3(CF_2)_yR \quad (8)$$

Herein R is hydrogen, halogen exclusive of fluorine, or a hydrocarbon group of 1 to 30 carbon atoms, x is a number in the range of 10 to 40, y is a number in the range of 2 to 40, each of x and y may be a single number or have a distribution in the range.

The compound of formula (7) wherein x=10 has a melting point of 75° C. Those compounds of formula (7) wherein x is less than 10 have a melting point below 50° C. and thus does not take powder form so that they are melted into the polymer of component (A), causing a viscosity increase. The high molecular weight compounds of formula (7) wherein x is more than 40 are difficult to migrate through the rubber and volatilize off from the surface during heat treatment.

The compounds of formula (8) wherein y=2 have a melting point which varies with the identity of R. Because of a lower fluorine content, those compounds of formula (8) wherein y is less than 2 are difficult to migrate through the rubber to reach the surface during heat treatment, failing to exert the mold release effect. Those compounds of formula (8) wherein y is more than 40 are difficult to migrate through the rubber and volatilize off from the surface during heat treatment.

These compounds may have a single molecular weight or a molecular weight distribution within the above-defined range. A mixture of compounds of formulae (7) and (8) may be used when incorporated in the composition.

R is hydrogen, halogen exclusive of fluorine, such as chlorine or iodine, or a hydrocarbon group of 1 to 30 carbon atoms. Examples of the hydrocarbon group of 1 to 30 carbon atoms include alkyl groups such as methyl, ethyl, propyl, butyl, hexyl, cyclohexyl, octyl and decyl, alkenyl groups such as vinyl and allyl, aryl groups such as phenyl, tolyl and naphthyl, and aralkyl groups such as benzyl and phenylethyl.

Preferred are those perfluoroparaffins of the following formula having a molecular weight within the indicated range.

$$CF_3(CF_2)_zCF_3 \quad z=10 \text{ to } 30$$

Specific examples of the perfluoroparaffin include $CF_3(CF_2)_{10}CF_3$, $CF_3(CF_2)_{14}CF_3$, $CF_3(CF_2)_{20}CF_3$, $CF_3(CF_2)_6C_{12}H_{25}$, $CF_3(CF_2)_{12}C_6H_5$, and $CF_3(CF_2)_{14}C_2H_5$.

These perfluoroparaffins are stable in chemical structure, industrially produced and commercially available in fine powder form, empirically safe, and easy to control the molecular weight distribution.

An appropriate amount of component (C) added is 0.1 to 20 parts by weight per 100 parts by weight of component (A). For a balance of mold release properties and mechanical properties and for stability, the preferred amount is 0.5 to 10 parts by weight. Mold release may not be expected at less than 0.1 pbw of component (C) whereas more than 20 pbw of component (C) may entail a substantial contraction after volatilization, which is undesirable for dimensional precision.

Component (D) is a hydrosilylation catalyst for promoting the addition reaction between alkenyl groups in component (A) and hydrosilyl groups in component (B). The hydrosilylation catalyst is often selected from noble metal compounds which are expensive. Platinum and platinum compounds are thus used because they are readily available.

Exemplary platinum compounds include chloroplatinic acid, complexes of chloroplatinic acid with olefins such as ethylene, complexes of chloroplatinic acid with alcohols and vinylsiloxanes, and metallic platinum supported on silica, alumina or carbon though not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$ wherein Ph denotes phenyl.

The hydrosilylation catalyst may be used in a catalytic amount. It is preferably added in an amount to give 0.1 to 100 parts by weight of platinum group metal per million parts by weight of components (A), (B) and (C) combined.

In addition to the foregoing components (A) to (D), fillers, typically reinforcing fillers may be added to the inventive composition for improving mechanical strength. Reinforcing fillers are added for the purposes of improving mechanical strength, thermal stability, weather resistance, chemical resistance and/or flame retardance, reducing thermal shrinkage upon curing, reducing the coefficient of thermal expansion of the cured elastomer, and/or lowering the gas permeability. The major purpose is to improve mechanical strength.

Exemplary fillers include fumed silica, wet silica, ground silica, calcium carbonate, diatomaceous earth, carbon black and various metal oxide powders, which may be treated with surface treating agents, if desired. Among others, fumed silica is preferred from the standpoint of improving mechanical strength. Fumed silica treated with a silane base surface treating agent is especially preferred because it is effectively dispersible.

The filler is preferably added in an amount of 5 to 200 parts by weight per 100 parts by weight of component (A). The amount of the filler preferred for the stability of mechanical properties is 10 to 60 parts by weight.

If desired, pigments, dyes and the like may be compounded in the curable fluoropolyether rubber composition of the invention. Insofar as the benefits of the invention are not impaired, various additives may be added to the inventive composition. Such optional additives include inhibitors of the hydrosilylation catalyst, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutenol; 3-methyl-3-penten-1-yne, 3,5-dimethyl-3-hexen-1-yne, and the like; polymethylvinylsiloxane cyclic compounds; and organophosphorus compounds. Incorporation of such an inhibitor leads to a compromise between cure reactivity and storage stability.

The method of preparing the curable fluoropolyether rubber composition of the invention is not critical. The composition may be formulated as a single composition by combining all the essential components. Alternatively, the rubber composition is formulated into two packs where the two packs are mixed together on use.

Cured parts can be formed by prior art known techniques, for example, by feeding the inventive composition into a suitable mold and causing the composition to cure therein, or by applying the inventive composition onto a suitable substrate and causing the coating to cure. Often, the composition is cured simply by heating at a temperature of about 100 to 180° C. for about 10 seconds to about 30 minutes.

The curable fluoropolyether rubber composition of the invention in the cured state has heat resistance, chemical resistance, solvent resistance, water repellency, oil repellency and weather resistance. In addition, the molded (or cured) parts have satisfactory compression set and smooth parting properties, especially mold release properties. Because of these features, the cured parts find a variety of applications.

Rubber articles using the cured composition of the invention are suitable for use in automobiles, chemical plants, ink jet printers, semiconductor manufacturing lines, analytical or scientific instruments, medical equipment, aircraft or fuel cells and as rubber parts such as diaphragms, valves, O-rings, oil seals, gaskets, packings, joints and face seals.

More illustratively, rubber articles comprising the cured composition of the invention are used as rubber parts for automobiles, rubber parts for chemical plants, rubber parts for ink jet printers, rubber parts for semiconductor manufacturing lines, rubber parts for analytical or scientific instruments, rubber parts for medical equipment, and rubber parts for aircraft, as well as tent film materials, sealants, molded parts, extruded parts, coatings, copier roll materials, electrical moisture-proof coatings, sensor potting materials, fuel cell seals, and laminate rubber fabrics.

Rubber articles made of the cured composition of the invention include, but are not limited to, rubber parts for automobiles, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets;

rubber parts for chemical plants, for example, pump diaphragms, valves, O-rings, packings, oil seals, and gaskets;

rubber parts for ink jet printers and semiconductor manufacturing lines, for example, diaphragms, valves, O-rings, packings, and gaskets;

rubber parts for analytical and scientific instruments and medical equipment, for example, pump diaphragms, O-rings, packings, valves, and joints;

rubber parts for aircraft, for example, O-rings, face seals, packings, gaskets, diaphragms, and valves in fluid piping for engine oil, jet fuel, hydraulic oil and Skydrol®; and rubber parts for fuel cells, for example, seals between electrodes, and O-rings, face seals, packings, gaskets, diaphragms and valves for hydrogen, air and coolant water feed conduits.

EXAMPLE

Examples of the invention are given below by way of illustration and not by way of limitation. All parts are by weight.

Preparation of a base compound and evaluation of rubber physical properties of cured compositions are described below.

Preparation of Base Compound

To 100 parts of a polymer of the formula (4) shown below (viscosity 8,500 cs, average molecular weight 22,000, vinyl content 0.009 mol/100 g) was added 25 parts of fumed silica treated with dimethylchlorosilane and having a specific surface area of 200 $m^2/g$. They were mixed, heat treated and milled on a three-roll mill. To the mixture were added 2.74 parts of a fluorinated organosilicon compound of the formula (5) shown below, 0.2 part of a toluene solution of a catalyst in the form of chloroplatinic acid modified with a compound of the formula (6) shown below (platinum concentration 1.0 wt %) and 0.4 part of a fluorine-modified acetylene alcohol. They were mixed to form a base compound.

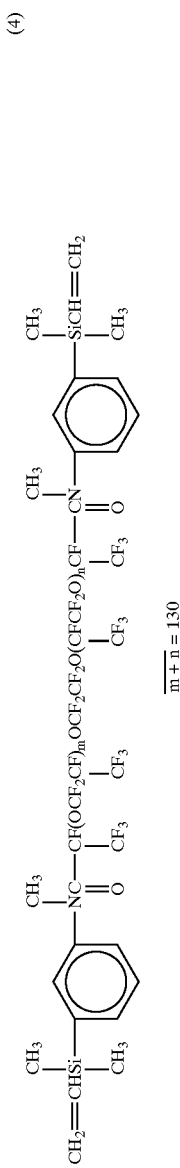
(4)
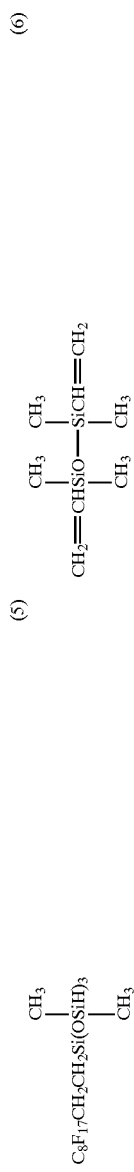
(5)
(6)

Rubber Physical Properties

A rubber composition was deaerated in vacuum, cast into a rectangular frame of 2 mm thick, deaerated again, and press cured at 100 kg/cm² and 150° C. for 10 minutes. A test specimen was cut from the cured sample and measured for hardness, elongation, tensile strength and tear strength according to JIS K6251, K6252 and K6253. Note that tear strength was measured on crescent shaped specimens. Also the viscosity of a rubber composition was measured according to JIS K7117.

Mold Release

A rubber composition was molded under the same conditions as above except that a mold having six O-ring-forming cavities of JIS P-8 size (whose surface was chromium plated) arranged in a rectangular frame of 2 mm thick was used. By examining how O-rings were removed from the mold, mold release was evaluated according to the following criterion.

⊚: very smooth
○: smooth
Δ: fairly smooth
X: difficult
XX: very difficult

Peeling force

A rubber composition was molded integrally with a chromium-plated plate (25 mm wide) under the same conditions as in the measurement of rubber physical properties. The force needed to peel the rubber coating from the plate was measured by a strograph E-L (Toyo Seiki Co., Ltd.).

Compression Set

A cured composition was measured for compression set under conditions: 200° C., 20 hours and 25% compression.

Examples 1–5 & Comparative Example 1

To the base compound, each of Additives A to E was added in the amount shown in Table 2. The resulting composition was mixed and cured, after which the rubber physical properties, mold release, peeling force and compression set of the cured composition were determined.

Table 1 shows the structure and properties of Additives A to E. Tables 2 and 3 show the test results of the compositions to which the additives were added.

The residue (%) on volatilization is determined by weighing 1 g of the additive in a glass dish, heating at 200° C. for 4 hours, and measuring the weight of the residue.

TABLE 1

| Additive | Structural formula | m.p. (° C.) | Residue (%) on volatilization |
|---|---|---|---|
| A | $CF_3(CF_2)_{10-20}CF_3$ | 90–115 | 0 |
| B | $CF_3(CF_2)_{10-22}CF_3$ | 90–123 | 0 |
| C | $CF_3(CF_2)_{12-20}CF_3$ | 100–155 | 0 |
| D | $CF_3(CF_2)_{14}CF_3$ | 126–134 | 0 |
| E | $C_8F_{17}C_{20}H_{41}$ | 58–65 | 8.6 |

TABLE 2

| Blending amount (pbw) | Example | | | | | Comparative Example |
|---|---|---|---|---|---|---|
| | 1 | 2 | 3 | 4 | 5 | 1 |
| Base compound | 100 | 100 | 100 | 100 | 100 | 100 |
| Additive A | 2 | | | | | — |

TABLE 2-continued

| Blending amount (pbw) | Example | | | | | Comparative Example |
|---|---|---|---|---|---|---|
| | 1 | 2 | 3 | 4 | 5 | 1 |
| Additive B | | 2 | | | | |
| Additive C | | | 2 | | | |
| Additive D | | | | 2 | | |
| Additive E | | | | | 2 | — |
| Properties | | | | | | |
| Viscosity (Pa·s) | 854 | 868 | 866 | 872 | 883 | 855 |
| Hardness (Durometer A) | 51 | 49 | 50 | 50 | 51 | 52 |
| Elongation (%) | 590 | 590 | 580 | 580 | 580 | 560 |
| Tensile strength (MPa) | 10.9 | 11 | 10.8 | 9.8 | 10.4 | 9.9 |
| Tear strength (kN/m) | 31 | 33 | 33 | 32 | 38 | 34 |
| Mold release | ○ | ○ | ○ | ○ | ○ | XX |
| Peeling force (kgf/25 mm) | 0.2 | 0.3 | 0.2 | 0.3 | 0.3 | 1.6 |
| Compression set (%) | 17 | 19 | 19 | 18 | 20 | 19 |

TABLE 3

| Blending amount (pbw) | Example | | | | |
|---|---|---|---|---|---|
| | 6 | 7 | 8 | 9 | 10 |
| Base compound | 100 | 100 | 100 | 100 | 100 |
| Additive D | 0.5 | 1 | 3 | 5 | 7 |
| Properties | | | | | |
| Viscosity (Pa·s) | 848 | 856 | 883 | 895 | 912 |
| Hardness (Durometer A) | 50 | 50 | 50 | 49 | 49 |
| Elongation (%) | 580 | 590 | 540 | 550 | 600 |
| Tensile strength (MPa) | 9.7 | 9.8 | 9.9 | 9.8 | 9.2 |
| Tear strength (kN/m) | 32 | 33 | 31 | 35 | 32 |
| Mold release | Δ | ○ | ⊚ | ⊚ | ⊚ |
| Peeling force (kgf/25 mm) | 0.9 | 0.3 | 0.2 | 0.1 | 0.1 |
| Compression set (%) | 18 | 20 | 19 | 20 | 21 |

As compared with Comparative Example 1 having no additive added, the compositions of Examples are significantly improved in mold release, substantially equal in compression set and approximately equal in viscosity and other physical properties.

Comparative Examples 2 to 4

To the base compound, Additive F, G or H, shown below, was added in the amount shown in Table 4. As in Examples, the resulting composition was mixed and cured, after which the rubber physical properties, mold release, peeling force and compression set of the cured composition were determined. The results are shown in Table 4.

Additive F: 2,2-bis(3,4-hydroxyphenyl)hexafluoropropane (also known as bisphenol AF)

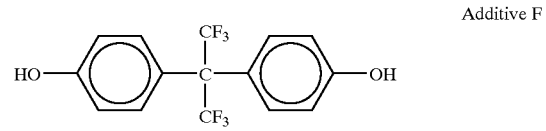

Additive F

Additive G: 2,2-bis(3,4-anhydrodicarboxyphenyl)hexafluoro-propane

Additive G

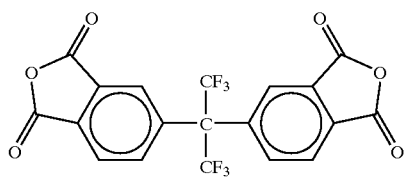

Additive H: 2,2-bis(4-carboxyphenyl)hexafluoropropane

Additive G'

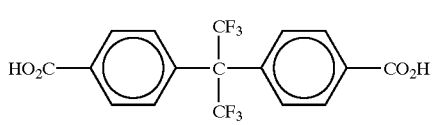

TABLE 4

| Blending amount | Comparative Example | | |
|---|---|---|---|
| (pbw) | 2 | 3 | 4 |
| Base compound | 100 | 100 | 100 |
| Additive F | 2 | — | — |
| Additive G | — | 2 | — |
| Additive H | — | — | 2 |
| Properties | | | |
| Viscosity (Pa · s) | 868 | 891 | 895 |
| Hardness (Durometer A) | 56 | 54 | 58 |
| Elongation (%) | 440 | 440 | 450 |
| Tensile strength (MPa) | 9.3 | 9.3 | 8.8 |
| Tear strength (kN/m) | 30 | 26 | 20 |
| Mold release | ⊚ | ◯ | ◯ |
| Peeling force (kgf/25 mm) | 0.3 | 0.5 | 0.4 |
| Compression set (%) | 32 | 29 | 35 |

Although mold release was improved, the compression set became poor in Comparative Examples 2 to 4 as compared with Examples and Comparative Example 1, probably because the additive was left in the cured composition.

The fluoropolyether rubber compositions of the invention, when cured, exhibit solvent resistance, chemical resistance and low moisture permeability because of a high fluorine content, smooth parting and water repellency because of low surface energy. Rubber articles comprising the cured compositions are useful in applications where acid resistance and oil resistance are required, as rubber materials for automobiles and aircraft, rubber materials for fuel cells, rubber materials for semiconductor manufacturing apparatus, tent film materials, sealants, molded parts, extruded parts, coatings, copier roll materials, electrical moisture-proof coatings, sensor potting materials, and release paper materials. Additionally, the curable fluoropolyether rubber compositions have good mold release and working efficiency. All these features enable the molding cycle to be completed within a short time and parts of complex shape to be molded in an effective way. Since molded parts themselves are little tacky, sticking is prohibited.

Japanese Patent Application No. 2002-335129 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable fluoropolyether rubber composition comprising
   (A) a straight-chain fluoropolyether compound having at least two alkenyl groups in a molecule and a perfluoropolyether structure in the backbone,
   (B) an organosilicon compound having at least two silicon atom-bonded hydrogen atoms in a molecule,
   (C) a perfluoroparaffin or perfluoroparaffin derivative having the general formula (7) or (8):

$$CF_3(CF_2)_xCF_3 \quad (7)$$

$$CF_3(CF_2)_yR \quad (8)$$

wherein R is hydrogen, halogen exclusive of fluorine, or a hydrocarbon group of 1 to 30 carbon atoms, x is a number in the range of 10 to 30, y is a number in the range of 6 to 14, each of x and y may be a single number or have a distribution in the range, in powder form which contains at least 80% by weight of a volatile component that volatilizes off when held in a drier at 200° C. for 4 hours, and has a melting point of at least 50° C., and
   (D) a hydrosilylation catalyst.

2. The composition of claim 1 wherein component (A) is a straight-chain fluoropolyether compound of the following general formula (1):

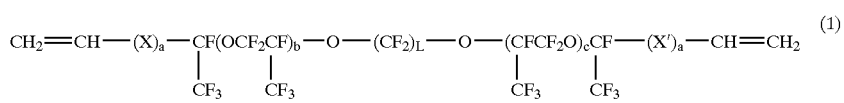

wherein X is —$CH_2$—, —$CH_2O$—, —$CH_2OCH_2$— or —Y—$NR^1$—CO— wherein Y is —$CH_2$— or a dimethylphenylsilylene group of the following structural formula (Z):

(o, m or p-position) and $R^1$ is hydrogen, methyl, phenyl or allyl,

X' is —$CH_2$—, —$OCH_2$—, —$CH_2OCH_2$— or —CO—$NR^1$—Y'— wherein Y' is —$CH_2$— or a dimethylphenylsilylene group of the following structural formula (Z'):

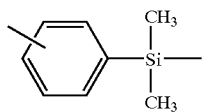 (Z')

(o, m or p-position) and $R^1$ is as defined above,
"a" is independently 0 or 1, L is an integer of 2 to 6, and b and c each are an integer of 0 to 200.

3. A rubber article comprising the curable fluoropolyether rubber composition of claim 1 in the cured state.

4. The rubber article of claim 3 for use in automobiles, chemical plants, ink jet printers, semiconductor manufacturing lines, analytical or scientific instruments, medical equipment, aircraft or fuel cells.

5. The rubber article of claim 4 which is a diaphragm, valve, O-ring, oil seal, gasket, packing, joint or face seal.

* * * * *